(12) United States Patent
Rijns

(10) Patent No.: US 6,219,310 B1
(45) Date of Patent: Apr. 17, 2001

(54) OPTICAL READ/WRITE APPARATUS

(75) Inventor: Johannes J. F. Rijns, Nijmegen (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/264,910

(22) Filed: Mar. 9, 1999

(30) Foreign Application Priority Data

Mar. 9, 1998 (EP) .................................................. 98200748

(51) Int. Cl.[7] .................................................. G11B 17/22
(52) U.S. Cl. ........................ 369/32; 369/47.15; 369/53.2
(58) Field of Search .................. 369/32, 44.11, 369/44.14, 44.31, 44.39, 47.15, 53.11, 33, 111, 124, 53.2

(56) References Cited

U.S. PATENT DOCUMENTS

| | | |
|---|---|---|
| 4,663,749 | 5/1987 | Bierhoff et al. . |
| 4,785,441 | 11/1988 | Tanaka et al. . |
| 4,855,983 | * 8/1989 | Arai . |
| 5,475,210 | * 12/1995 | Taguchi et al. . |
| 5,550,797 | * 8/1996 | Kimura et al. . |

FOREIGN PATENT DOCUMENTS

| | | |
|---|---|---|
| 0265984A1 | 5/1988 | (EP) . |
| 0508522A2 | 10/1992 | (EP) . |
| 1279428 | 11/1989 | (JP) . |

* cited by examiner

*Primary Examiner*—Ali Neyzari
(74) *Attorney, Agent, or Firm*—Steven R. Biren

(57) ABSTRACT

An optical read/write apparatus includes a first detector for detecting light reflected from an optical record carrier and generating a signal; and a signal processing unit. The processing unit includes: a common input clamp coupled to the first detector; separation apparatus for separating low frequency and high frequency components of the detected signal, including a capacitive element; low frequency apparatus for processing the low frequency components and including a current mirror having a first output clamp and a first input clamp coupled to the common input clamp. The processor unit further includes high frequency apparatus for processing the high frequency components and including: a current source with a current output clamp; a second current mirror with an input branch; a second input clamp coupled to the common input clamp via the capacitive element; and a second output clamp. The current output clamp of the current source and the input branch of the current mirror are both coupled to the second input clamp. In this way a bias-free processing of the low-frequency components and a large bandwidth for the high-frequency components are both provided.

10 Claims, 4 Drawing Sheets

OPTICAL READ/WRITE APPARATUS

FIELD OF THE INVENTION

The invention relates to the field of optical digital information readers and more specifically to the field of processing signals produced by a radiation detector depending on a laser beam reflected from a rotating optical disk.

BACKGROUND OF THE INVENTION

An optical read/write apparatus is known from European Patent EP 508 522. The requirements imposed on the processing of the low frequency components and the high frequency components of the detected signal differ substantially. The position of the detector and the alignment of the optical system are controlled by a control signal derived from the low frequency components of the detected signal. For this, an accurate and offset-free amplification are important. For the high frequency components, from which the information signal is derived, a comparatively large bandwidth and a relatively constant group delay are required. The European Patent proposes an optical read/write apparatus in which, the high frequency components and the low frequency components are separated from one another by a filter having a resistor arranged between the common input terminal and the first input terminal; and having a capacitor arranged between the first input terminal and the second input terminal. Subsequently, the high frequency components and the low frequency components are processed separately.

U.S. Pat. No. 4,663,749 describes an optical read/write apparatus in which the low frequency components are amplified by a current amplifier whose input current also constitutes the bias current, as a result of which, an offset-free low frequency amplification is achieved. The high frequency signals are processed by a separate amplifier.

JP 12-79428 describes an optical read/write apparatus in which, signals from photodetectors are separated into high frequency components, and low frequency components and are subsequently amplified by operational amplifiers. The amplified low frequency signal is recombined with the high frequency signal.

U.S. Pat. No. 4,785,441 describes apparatus for achieving a reliable tracking in an optical read/write system. In this system the high frequency components are also processed separately from the low frequency components.

The above citations are hereby incorporated herein in whole be reference.

SUMMARY OF THE INVENTION

Consequently, there is a need for optical read/write apparatuses having a signal processing unit in which, high frequency components and low frequency components are separated from one another directly, after the output of the detector and are processed separately.

In order to cater to this, according to the invention, the apparatus of the type defined in the opening paragraph is characterized in that, apparatus $M_{III}$ for processing the high frequency components include a bias current source and a second current mirror, an input branch of the second current mirror and a current output terminal of the bias current source both being connected to the second input terminal of apparatus $M_{III}$. The bias current source enables the second current mirror of apparatus $M_{III}$ to be biased to a value at which, a satisfactory bandwidth can be obtained without the operation of apparatus $M_{II}$ being affected thereby.

Apparatus $M_{II}$ are usually implemented as a self-biased amplifier, the current supplied by the detector also serving as bias current. This may lead to the input impedance of apparatus $M_{II}$ being dependent on the intensity of the current supplied by the detector. This affects the operation of apparatus $M_I$, which in turn may result in crosstalk from the low frequency components to the high frequency components. It is an object of the invention to preclude such crosstalk. In a first embodiment, the current mirror of the apparatus $M_{II}$ includes an operational amplifier, a bias voltage source, and a first and a second semiconductor element, which operational amplifier has an inverting input, a non-inverting input, and an output, which semiconductor elements each include main electrodes, which define a main current path, and a control electrode, the control electrode of the first semiconductor element and the control electrode of the second semiconductor element being connected to one another, the current mirror of apparatus $M_{II}$ further includes a first input branch for transferring an input current, which first input branch connects the first input terminal to a first central terminal via the main current path of the first semiconductor element, the first main electrode of the first semiconductor element being connected to the first input terminal, which current mirror further includes a first output branch for transferring an output current, which first output branch connects the first central terminal to the first output terminal via the main current path of the second semiconductor element, the operational amplifier having one of its inputs connected to a voltage output terminal of the bias voltage source, the operational amplifier having its other input connected to the first main electrode of the first semiconductor element, and the operational amplifier having its output coupled to one of the other electrodes of the first semiconductor element. The effect of the operational amplifier is that apparatus $M_{II}$ have such a low input impedance that they do not have any significant influence on the operation of apparatus $M_I$.

In another embodiment which also precludes crosstalk, apparatus $M_{II}$ have a comparatively high input impedance. In the other embodiment, the current mirror of the apparatus $M_{II}$ includes a first and a second semiconductor element, which semiconductor elements each include main electrodes, which define a main current path, and a control electrode, the control electrode of the first semiconductor element and the control electrode of the second semiconductor element being connected to one another, which current mirror includes a first input branch for transferring an input current, which first input branch connects the first input terminal to a first central terminal via the main current path of the first semiconductor element, which current mirror further includes a first output branch for transferring an output current, which first output branch connects the first central terminal to the first output terminal via the main current path of the second semiconductor element, the first semiconductor element and the second semiconductor element being connected to the first central terminal via a first resistive element and a second resistive element, respectively. However, since the input impedance is now substantially signal independent, allowance can be made for this in the choice of apparatus $M_I$ and, if desired, the input impedance can form part of apparatus $M_I$.

Apparatus $M_I$ for separating high frequency components and low frequency components of the detected signal, give rise to a zero point in the signal transmission from the detector to apparatus $M_{III}$ for processing the high frequency components. The presence of the zero point is not of any significance for the transmission of the signal because the low frequency components do not contain any data information. However, the zero point does have an adverse effect on the flatness of the group delay response of the information signal. The object of a further embodiment is to mitigate this adverse effect. In the further embodiment, the current mirror in the apparatus $M_{II}$ has a further output terminal for supplying a further output current ($I"_{LF}$) and the signal processing unit further includes apparatus $M_{IV}$ for coupling the apparatus $M_{II}$ to the apparatus $M_{III}$, which apparatus $M_{IV}$ includes a third input terminal for receiving the further output current ($I"_{LF}$) and a third output terminal for supplying to the second input terminal of the apparatus $M_{III}$ a current ($\%I"_{LF}$) which is related to the further output current. In this further embodiment, the low frequency component of the signal, which reaches the input of apparatus $M_{III}$, is reconstructed, so that, the zero point is compensated by a pole. The reconstruction provides a flatter group-delay response of the information signal.

In a practical variant of the further embodiment in a simple manner the current supplied by apparatus $M_{IV}$ has the correct phase for reconstructing the signal on the input of apparatus $M_{II}$. In this varient, the apparatus $M_{IV}$ take the form of a third current mirror, which has a third input branch for transferring an input current, which third input branch has a fifth semiconductor element which connects the third input terminal of apparatus $M_{IV}$ to a third central terminal via its main current path, which third output branch has a sixth semiconductor element which connects the third central terminal to the third output terminal via its main current path.

On the one hand, a satisfactory gain matching of the low frequency components is of importance for an accurate pole/zero-point cancellation and, consequently, a flat group-delay response. On the other hand, a large bandwidth is important and the gain matching is less relevant for the high frequency components. A third embodiment provides a very accurate gain matching of the of the low frequency components and a large bandwidth for the high frequency components. In the third embodiment, the second current mirror $M_{III}$ includes a third semiconductor element and a fourth semiconductor element, which semiconductor elements each include main electrodes, which define a main current path, and a control electrode, the control electrode of the third semiconductor element and the control electrode of the fourth semiconductor element being connected to one another, which second current mirror includes a second input branch for transferring an input current, which second input branch connects the second input terminal to a second central terminal via the main current path of the third semiconductor element, which second current mirror further includes a second output branch for transferring an output current, which second output branch connects the second central terminal to the second output terminal via the main current path of the fourth semiconductor element, the third semiconductor element of the second current mirror being connected to the second central terminal via a parallel arrangement of a third resistive element and a second capacitive element, and the fourth semiconductor element being connected to the second central terminal via a parallel arrangement of a fourth resistive element and a third capacitive element.

The above citations are hereby incorporated in whole by reference.

BRIEF DESCRIPTION OF THE DRAWINGS

The above as well as other aspects of the invention will be described in more detail with reference to the drawings. In the drawings.

DETAILED DESCRIPTION OF PREFERRED EMBODIMENTS

Figure 1:
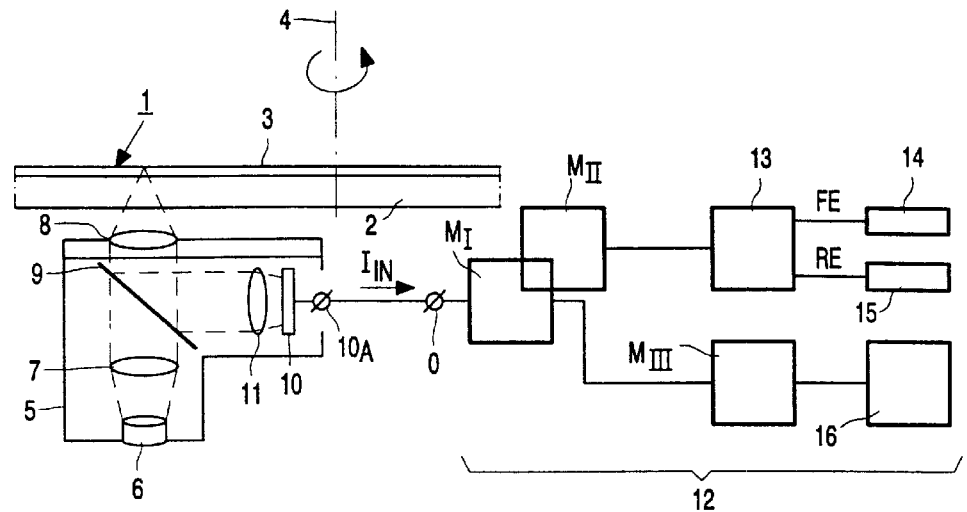
FIG. 1 shows a block diagram of an optical read/write apparatus in accordance with the invention.

FIG. 1 shows diagrammatically, an optical read/write apparatus for reading from and/or writing onto an optical data carrier 1. In the present case, the optical data carrier 1 is a writable optical data carrier of a customary type, for example, as described in European Patent EP-A 0 265 984 hereby incorporated herein in whole by reference. The optical data carrier 1 has a transparent substrate 2 provided with a structure of tracks which are substantially concentric with one another. The tracks exhibit a radial wobble whose frequency is modulated in accordance with a DC free digital address signal. The substrate 2 carries a layer provided with an optical pattern. The layer 3 is, for example, a radiation-sensitive dye layer or a so-called phase-change layer. the data carrier 1 is given a rotary motion about an axis 4 in a well known manner.

The optical read/write apparatus includes an optical read/write head 5 for writing information patterns into or reading such patterns from a track. The head has a radiation source 6 for generating a radiation beam. The radiation source 6 is, for example, a solid-state laser. The optical read/write head further has an optical system for routing the radiation beam to a radiation-sensitive detector 10 via the data carrier 1. The detector 10 has an output 10A for supplying a detected signal, which is a measure of radiation detected by the detector. In the present case, the optical system includes a lens 7, a focusing objective 8, and a beam splitter 9. The radiation beam generated by radiation source 6, is focussed onto the layer 3 of the optical data carrier 1 by lens 7 and the focussing objective 8. The radiation beam reflected from the layer 3, is reflected to the detector 10 via the beam splitter 9, for example, a semi-transparent mirror. Furthermore, in the present case, an astigmatic element 11 for detecting a focus error is interposed between the beam splitter 9 and the detector 10.

The output $10_A$ of the detector 10 is coupled to a common input terminal 0 of a signal processing unit 12 to receive the detected signal $I_{IN}$, the signal processing unit including apparatus $M_I$ for separating high frequency components and low frequency components of the detected signal $I_{IN}$, apparatus $M_{II}$ for processing the low frequency components, and apparatus $M_{III}$ for processing the high frequency components.

The signal processing unit 12 further including apparatus 16 for deriving an information signal on the basis of the high frequency components. The information signal is a representation of the information stored on the data carrier.

apparatus 16 includes, for example, a demodulator, a timebase corrector, an error corrector, and a D/A converter.

The signal processing unit 12 further includes apparatus 13 for deriving control signals FE (focus error signal) and RE (radial push-pull signal) on the basis of the low frequency components. The focus error signal FE is received by an input of a control circuit 14, which minimizes the focus error in a manner known per se. The radial push-pull signal RE is frequency-modulated owing to the frequency-modulated track wobble. An FM demodulator 15 derives an address signal from the signal RE. Various methods of deriving these control signals are known, which methods are based on the division of a photo-detector into sections, for example, four quadrants or, for example, four sections disposed in line. Thus in practice, a proportional number of apparatus MI and $M_{II}$ can be used. However, herein these apparatus are shown for only one detector for the sake of simplicity. Preferably, the apparatus $M_I$ and $M_{II}$ for the other detectors are identical thereto.

Figure 2:
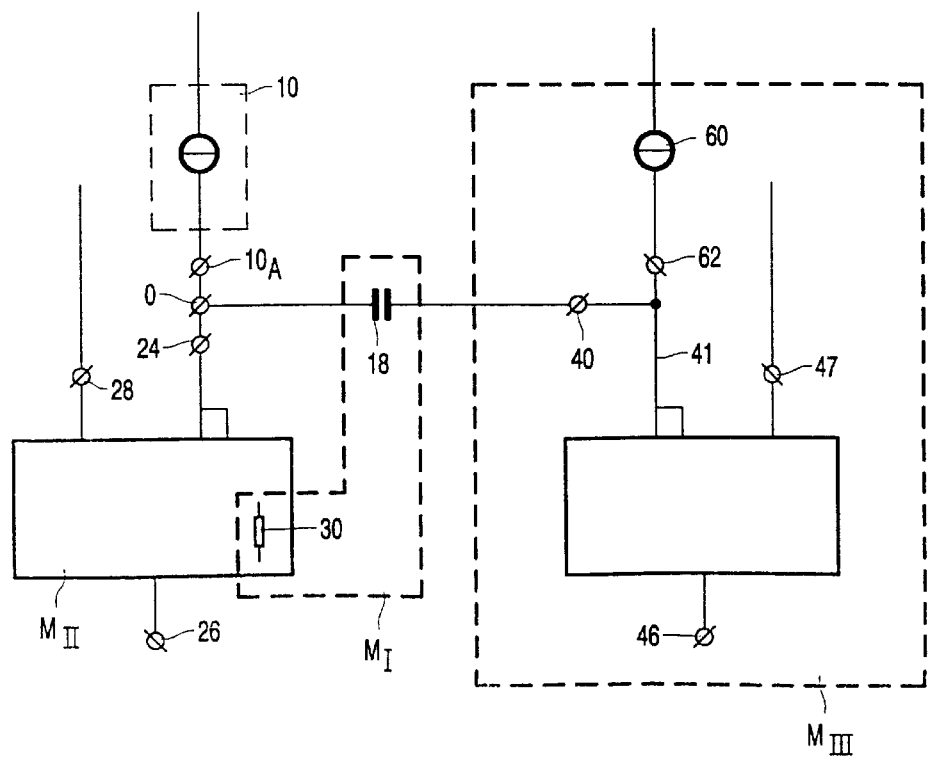
FIG. 2 shows a block diagram of apparatus $M_I$ for separating high frequency components and low frequency components of the detected signal, apparatus $M_{II}$ for processing the low frequency components, and apparatus $M_{III}$ for processing the high frequency components.

Apparatus $M_I$ and $M_{II}$ and $M_{III}$ of FIG. 1 are shown in greater detail in FIG. 2. Apparatus $M_I$ for separating the high frequency components and the low frequency components of the detected signal, include a capacitive element 18.

Apparatus $M_{II}$ for processing the low frequency components, include a current mirror having a first input terminal 24 and a first output terminal 28. The first input terminal 24 is coupled to the common input terminal 0.

Apparatus $M_{III}$ for processing the high frequency components, have a second input terminal 40 coupled to the common input terminal 0 via the capacitive element 18. Apparatus $M_{III}$ for processing the high frequency components, include a bias current source 60 and a second current mirror. An input branch 41 of the second current mirror and a current output terminal 62 of the bias current source 60 are both connected to the second input terminal 40 of apparatus $M_{III}$.

Figure 3:
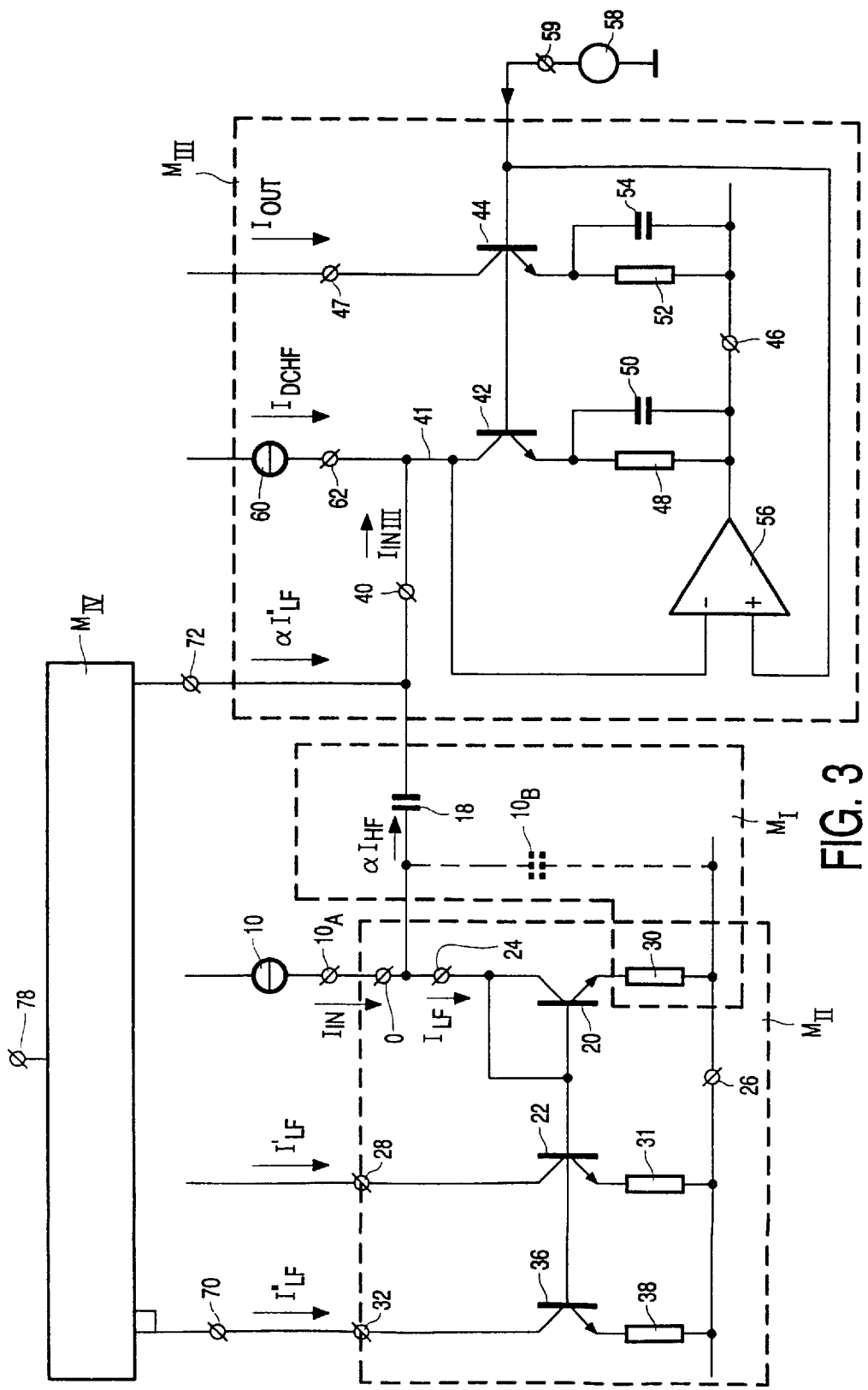
FIG. 3 shows in more detail, apparatus $M_I$, $M_{II}$ and $M_{III}$, and shows diagrammatically, apparatus $M_{IV}$ for coupling the apparatus $M_{II}$ to apparatus $M_{III}$ of a first embodiment.

FIG. 3 shows apparatus $M_I$, $M_{II}$ and $M_{III}$ of a first embodiment of the optical read/write apparatus in accordance with the invention in greater detail. In the present case, the self-biased current mirror of apparatus $M_{II}$ includes a first semiconductor element 20 and a second semiconductor element 22. The first semiconductor element 20 and the second semiconductor element 22 each have a main electrode and a first and a second control electrode, a main current path being interposed between the first and the second main electrode. It is to be noted, that semiconductor elements in this Figure and the following Figures may be bipolar transistors whose bases, collectors, and emitters constitute the control electrode, the first main electrode and the second main electrode, respectively. However, alternatively, the semiconductor elements can be unipolar transistors whose gate, drain, and source constitute the control electrode, the first main electrode, and the second main electrode, respectively.

The current mirror 20, 22 has a first input branch for transferring an input current ($I_{LF}$). The first input branch connects the first input terminal 24 to a first central terminal 26 via the main current path of the first semiconductor element 20. The control electrode and the first main electrode of the first semiconductor element 20 are interconnected. The current mirror further has a first output branch for transferring an output current ($I'_{LF}$). The first output branch connects the first central terminal 26 to the first output terminal 28 via the main current path of the second semiconductor element 22. The control electrode of the second semiconductor element 22 is connected to the control electrode of the first semiconductor element 20. FIG. 3 also shows, in broken lines, the parasitic capacitive impedance 10B of the detector 10 between the first input terminal 24 and the first central terminal 26.

The first semiconductor element 20 of the current mirror of apparatus $M_{II}$, is connected to the first central terminal 26 via a first resistive element 30. The presence of the first resistive element 30 in the first input branch of the current mirror of apparatus $M_{II}$, ensures that apparatus $M_{II}$ have a relatively signal-independent input impedance. This counteracts crosstalk of the low frequency components to the high frequency components. In addition to the capacitive element 18, apparatus $M_I$ include the parasitic capacitance 10B of the detector 10. Apparatus $M_I$ further include the resistive element 30, which in the present case, also forms part of apparatus $M_{II}$. Since, in the present case, the resistive element is used both in apparatus $M_I$ and in apparatus $M_{II}$, separate resistive elements for apparatus $M_I$ and $M_{II}$ are not necessary. This reduces the dissipation. In the present case, apparatus $M_I$ produce a pole in the transfer function $I_{LF}/I_{IN}$ at a frequency f of $2\pi/R(C_P+C_{AC})$, where R is the resistive value of the first resistive element 30, and $C_P$ and $C_{AC}$ are the capacitive values of the parasitic capacitance $10_B$ and the capacitive element 18, respectively. The transfer function for the signal from the detector 10 to apparatus $M_{III}$ has a zero point for the same frequency f. The high frequency signal at the central terminal are transferred to the second input terminal 40 of apparatus $M_{III}$ with an attenuation factor $\%=C_{AC}/(C_P+C_{AC})$.

For reasons of symmetry, the second semiconductor element 22 of the current mirror is connected to the central terminal 26 via a second resistive element 31.

Since apparatus $M_{II}$ need only handle low frequency components of the detected signal, the first and the second semiconductor element 20, 22 can be comparatively large in the case of implementation as an IC, as a result of which, a satisfactory gain matching and a satisfactory DC transmission are achieved.

In the embodiment shown in FIG. 3, the current mirror of apparatus $M_{II}$ has a further output terminal 32 for supplying a further output current ($I''_{LF}$). The signal processing unit 12 further includes apparatus $M_{IV}$ for coupling apparatus $M_{II}$ to apparatus $M_{IV}$. Apparatus $M_{IV}$ have a third input terminal 70 for receiving the further output current ($I''_{LF}$). Apparatus $M_{IV}$ further have a third output terminal 72 for supplying a related current $\%I''_{LF}$ to the second input terminal 40 of apparatus $M_{III}$.

The further output terminal 32 is connected to the first central terminal 26 via a further output branch. The further output branch is formed by a main current path of a further semiconductor element 36 and by a further resistive element 38 arranged between said main current path and the first central terminal 26. A control electrode of the further semiconductor element 36 is connected to the control electrodes of the first semiconductor element 20 and the second semiconductor element 22.

Apparatus $M_{IV}$ supply a current $\%I''_{LF}$ which is proportional to the low frequency component $I_{LF}$ of the detected signal. The proportionality factor % is chosen to be equal to the afore-mentioned attenuation factor. Thus, except for the proportionality factor %, the detected signal $I_{IN}$ is reconstructed on the second input terminal 40 of apparatus $M_{III}$.

The second current mirror of apparatus $M_{III}$ includes a third semiconductor element 42 and a fourth semiconductor element 44, each having a first and a second main electrode which define a main current path, and a control electrode.

The control electrode of the third semiconductor element 42 and the control electrode of the fourth semiconductor element 44 are connected to one another. The second current mirror has a second input branch 41 for transferring an input current ($I_{INIII}+I_{DCHF}$). The second input branch 41 connects the second input terminal 40 to a second central terminal 46 via the main current path of the third semiconductor element 42. The second current mirror further has a second output branch for transferring an output current ($I_{OUT}$). The second output branch connects the second central terminal 46 to second output terminal 47 via the main current path of the fourth semiconductor element 44.

In the present embodiment, the third semiconductor element 42 is connected to the second central terminal 46 via a parallel arrangement of a third resistive element 48 and a second capacitive element 50. The fourth semiconductor element 44 is connected to the second central terminal 46 via a parallel arrangement of a fourth resistive element 52 and a third capacitive element 54. The third resistive element 48 and the fourth resistive element 52 provide accurate gain matching for low frequencies. The second capacitive element 50 and the third capacitive element 54 constitute a short-circuit for high frequencies, as a result of which, apparatus $M_{III}$ has a large bandwidth.

In the present embodiment, apparatus $M_{III}$ also include an operational amplifier 56 and a bias voltage source 58. The operational amplifier 56 has an inverting first input connected to the input 40 of apparatus $M_{III}$. The operational amplifier 56 has a non-inverting second input connected to a voltage output terminal 59 of the bias voltage source 58. The voltage output terminal 59 of the bias voltage source 58 is also connected to the control electrodes of the third semiconductor element 42 and the fourth semiconductor element 44. The operational amplifier 56 has an output connected to the second central terminal 46. The operational amplifier 56 constitutes a virtual short-circuit between the control electrode and the first main electrode of the third semiconductor element 42, as a result of which, this semiconductor element operates as an input branch 41 having a very low input impedance.

Figure 4:
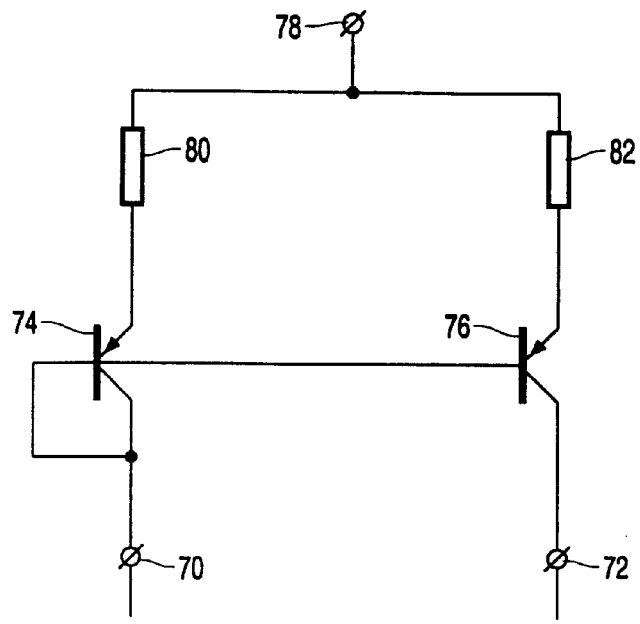
FIG. 4 shows in more detail, apparatus $M_{IV}$ in the first embodiment.

FIG. 4 shows apparatus $M_{IV}$ shown in the embodiment of FIG. 3 in greater detail. In the present case, apparatus $M_{IV}$ are constructed as a third current mirror. The third current mirror has a third input branch for transferring an input current. The third input branch has a fifth semiconductor element 74 which connects the third input terminal 70 to a third central terminal 78 via its main current path. The third current mirror has a third output branch for transferring an output current. The third output branch has a sixth semiconductor element 76 which connects the third central terminal 78 to the third output terminal 72 via its main current path.

In the present case, a fifth resistive element 80 having a resistive impedance R1, is arranged between the main current path of the fifth semiconductor element 74 and the third central terminal 78. Also, a sixth resistive element 82 having a resistive impedance R2, is arranged between the main current path of the sixth semiconductor element 76 and the third central terminal 78. Thus, it is achieved that the output current is equal to the input current multiplied by a factor R1/R2. Alternatively, this factor can be realized by the choice of the resistive elements 30 and 38 in the current mirror of apparatus $M_{II}$. In that case, the main current path of the fifth semiconductor element 74 and the sixth semiconductor element 76 can be coupled directly to the third terminal 78.

Figure 5:
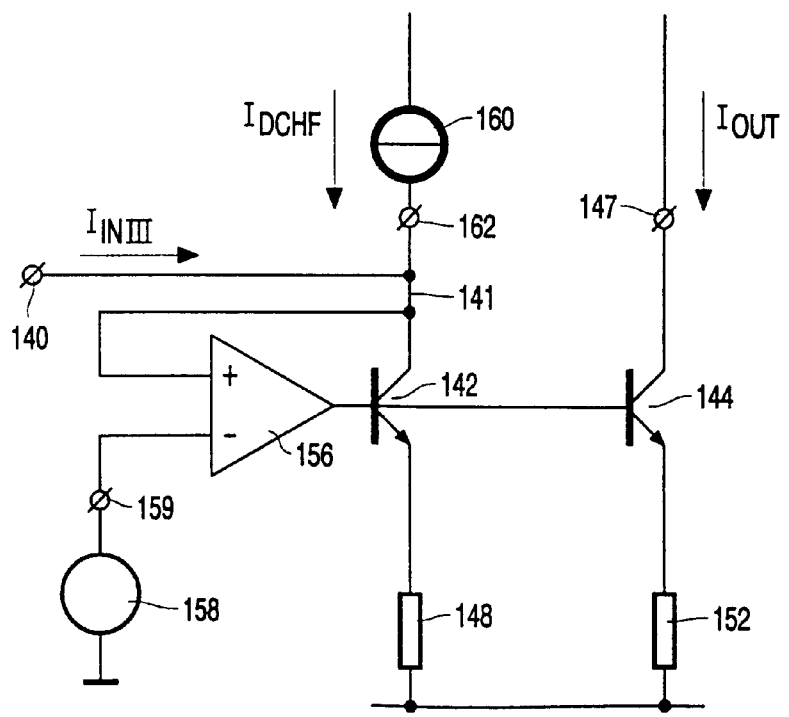
FIG. 5 shows in more detail, apparatus $M_{III}$ of a second embodiment.

FIG. 5 shows an alternative version of apparatus $M_{III}$. Parts therein which correspond to those in FIG. 3 have corresponding reference numerals increased by 100. In FIG. 5, the non-inverting input of the operational amplifier 156 is connected to the second input terminal 140 of apparatus $M_{III}$. The inverting input of the operational amplifier 156 is connected to the voltage output terminal 159 of the bias voltage source 158. The output of the operational amplifier 156 is connected to the control electrodes of the semiconductor elements 142 and 144.

The use of an operational amplifier in apparatus $M_{III}$, as shown in FIG. 3 and FIG. 5, enables a comparatively large bandwidth to be obtained for apparatus $M_{III}$. For simple uses in which the high frequency components have only a comparatively small bandwidth, a version of apparatus $M_{III}$ is conceivable which does not employ an operational amplifier. In that case, the control electrode of the third semiconductor element is connected to the input of apparatus $M_{III}$.

Figure 6:
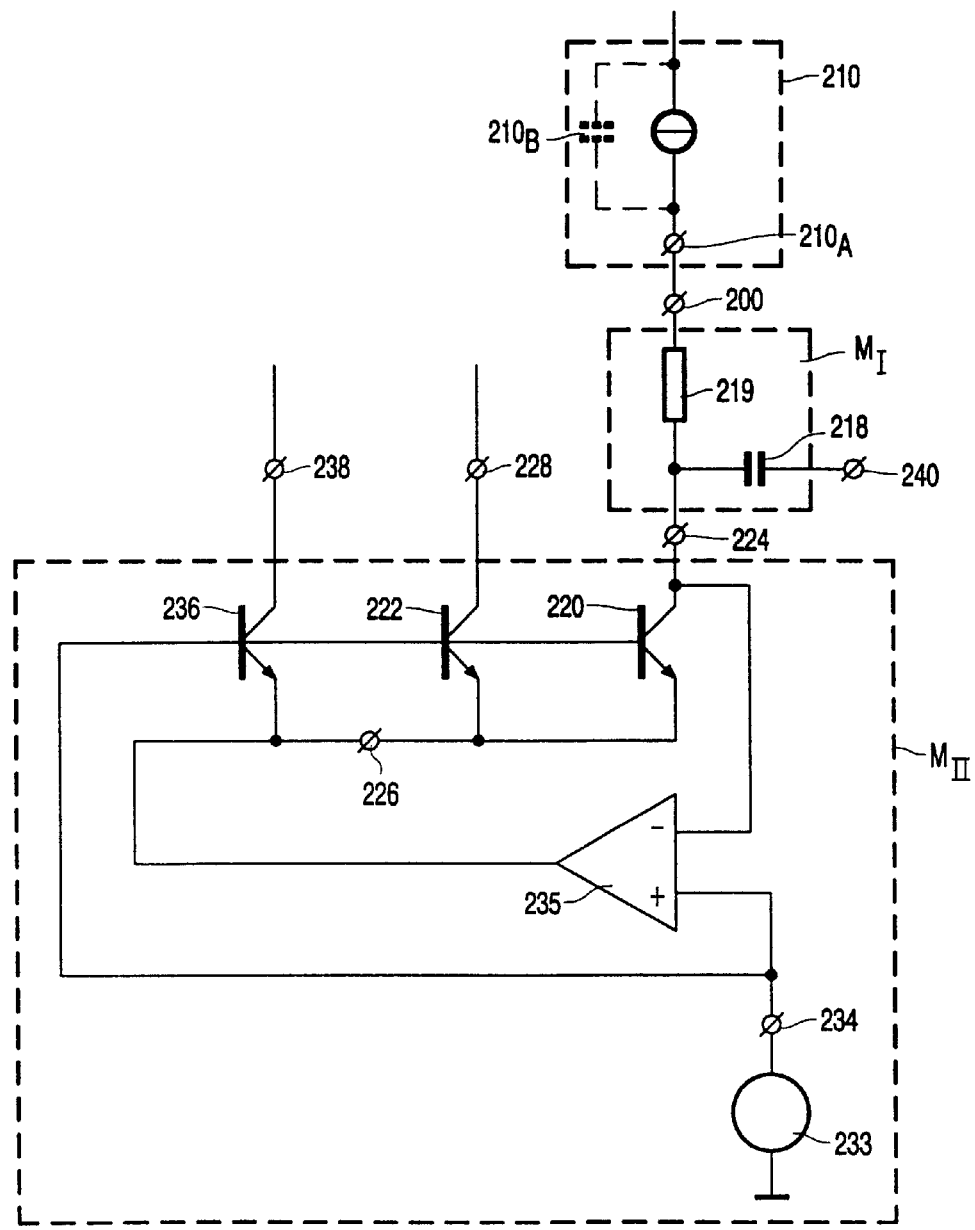
FIG. 6 shows in more detail, apparatus $M_I$ and $M_{II}$ of a third embodiment.

FIG. 6 shows an alternative version of apparatus $M_I$ and $M_{II}$. Parts therein which correspond to those in FIG. 3, have corresponding reference numerals increased by 200. In FIG. 6, apparatus $M_{II}$ also include an operational amplifier 235 and a bias voltage source 233. One of the inputs of the operational amplifier 235, in this case the inverting input, is connected to the first main electrode of the first semiconductor element 220. The non-inverting other input of the operational amplifier 235 is connected to a voltage output terminal 234 of the bias voltage source 233. The output of the operational amplifier 235 is coupled to one of the other electrodes, in this case the second main electrode, of the first semiconductor element 220.

The present apparatus $M_I$ include the capacitive element 218 and a resistive element 219. In the present case, the resistive element 219 is arranged between the common input terminal 200 and the first input terminal 224 of apparatus $M_{II}$.

In a variant of apparatus $M_{II}$, in a manner similarly to that shown in FIG. 5, the voltage output terminal 234 of the bias voltage source 233 is connected to the inverting input of the operational amplifier 235, and the first main electrode of the first semiconductor element 220 is connected to the non-inverting input. The control electrodes of the semiconductor elements 220, 222 and 236, in this variant, are connected to the output of the operational amplifier.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. An optical read/write apparatus for reading from and/or writing onto an optical data carrier, comprising:
   radiation source means for generating a radiation beam;
   radiation-sensitive detector means including an output terminal, for supplying a detection signal from the output terminal depending on detection of the radiation beam;
   an optical system for routing the radiation beam to the detector means via the data carrier;
   a signal processing unit having a common input terminal coupled to the output terminal of the detector means to receive the detection signal, the signal processing unit including:
   means for separating high frequency components and low frequency components from the detected signal, including a capacitive element;

means for processing the low frequency components, including a first current mirror having a first output terminal and a first input terminal coupled to the common input terminal;

means for processing the high frequency components, including: a second output terminal; a second input terminal coupled to the common input terminal via the capacitive element; a bias current source with a current output terminal connected to the second input terminal; and a second current mirror with an input branch connected to the second input terminal.

2. The apparatus of claim 1, in which:

the first current mirror of the low frequency processing means further have: a bias voltage source; an operational amplifier with an inverting input, a non-inverting input, and an output; and a first and second semiconductor element each including main electrodes defining a main current path, and a control electrode:

the control electrode of the first semiconductor element and the control electrode of the second semiconductor element are connected to one another;

the first current mirror of the low frequency processing means further has a first input branch for transferring an input current and connecting the first input terminal to a first central terminal via the main current path of the first semiconductor element;

the first main electrode of the first semiconductor element is connected to the first input terminal;

the first current mirror further has a first output branch for transferring an output current and which connects the first central terminal to the first output terminal via the main current path of the second semiconductor element;

the operational amplifier has one of its inputs connected to a voltage output terminal of the bias voltage source, its other input connected to the first main electrode of the first semiconductor element, and its output coupled to one of the other electrodes of the first semiconductor element.

3. The apparatus of claim 1, in which the first current mirror of the low frequency processing means further has:

a first and a second semiconductor element, each including main electrodes defining a main current path, and a control electrode; the control electrode of the first semiconductor element and the control electrode of the second semiconductor element being connected to one another;

a first input branch for transferring an input current and connecting the first input terminal to a first central terminal via the main current path of the first semiconductor element; and a first output branch for transferring an output current and connecting the first central terminal to the first output terminal via the main current path of the second semiconductor element;

and in which the first semiconductor element and the second semiconductor element are connected to the first central terminal via a first resistive element and a second resistive element, respectively.

4. The apparatus of claim 1, in which:

the first current mirror of the low frequency processing means has a further output terminal for supplying a further output current; and the signal processing unit further includes: means for coupling the low frequency processing means to the high frequency processing means; a third input terminal for receiving the further output current; and a third output terminal for supplying to the second input terminal of the high frequency processing means, a current which is related to the further output current.

5. The apparatus of claim 4, in which:

the coupling means include a third current mirror with a third input branch for transferring an input current;

the third branch having a fifth semiconductor element connecting the third input terminal of the coupling means to a third central terminal via the main current path of the fifth semiconductor element; and the third output branch has a sixth semiconductor element connecting the third central terminal to the third output terminal via its main current path.

6. The apparatus of claim 4, in which:

the second current mirror of the high frequency processing means include a third semiconductor element and a fourth semiconductor element, each having main electrodes defining a main current path, and a control electrode, the control electrode of the third semiconductor element and the control electrode of the fourth semiconductor element are connected to one another;

the second current mirror includes:

a second input branch for transferring an input current and connecting the second input terminal to a second central terminal via the main current path of the third semiconductor element; and a second output branch for transferring an output current and connecting the second central terminal to the second output terminal via the main current path of the fourth semiconductor element;

and in which:

the third semiconductor element of the second current mirror is connected to the second central terminal via a parallel arrangement of a third resistive element and a second capacitive element; and the fourth semiconductor element is connected to the second central terminal via a parallel arrangement of a fourth resistive element and a third capacitive element.

7. The apparatus of claim 5, in which:

the second current mirror of the high frequency processing means include a third semiconductor element and a fourth semiconductor element, each having main electrodes defining a main current path, and a control electrode, the control electrode of the third semiconductor element and the control electrode of the fourth semiconductor element are connected to one another;

the second current mirror includes:

a second input branch for transferring an input current and connecting the second input terminal to a second central terminal via the main current path of the third semiconductor element; and a second output branch for transferring an output current and connecting the second central terminal to the second output terminal via the main current path of the fourth semiconductor element;

and in which:

the third semiconductor element of the second current mirror is connected to the second central terminal via a parallel arrangement of a third resistive element and a second capacitive element; and the fourth semiconductor element is connected to the second central terminal via a parallel arrangement of a fourth resistive element and a third capacitive element.

8. The apparatus of claim 1, in which:

the first current mirror of the low frequency processing means has a further output terminal for supplying a further output current;

the signal processing unit further includes: means for coupling the low frequency processing means to the high frequency processing means; a third input terminal for receiving the further output current; and a third output terminal for supplying to the second input terminal of the high frequency processing means, a current which is related to the further output current;

the coupling means include a third current mirror with a third input branch for transferring an input current;

the third branch having a fifth semiconductor element connecting the third input terminal of the coupling means to a third central terminal via the main current path of the fifth semiconductor element;

the third output branch has a sixth semiconductor element connecting the third central terminal to the third output terminal via its main current path;

the second current mirror of the high frequency processing means include a third semiconductor element and a fourth semiconductor element, each having main electrodes defining a main current path, and a control electrode, the control electrode of the third semiconductor element and the control electrode of the fourth semiconductor element are connected to one another;

the second current mirror includes:

a second input branch for transferring an input current and connecting the second input terminal to a second central terminal via the main current path of the third semiconductor element; and a second output branch for transferring an output current and connecting the second central terminal to the second output terminal via the main current path of the fourth semiconductor element;

and in which:

the third semiconductor element of the second current mirror is connected to the second central terminal via a parallel arrangement of a third resistive element and a second capacitive element; and the fourth semiconductor element is connected to the second central terminal via a parallel arrangement of a fourth resistive element and a third capacitive element.

9. The apparatus of claim 2, in which:

the first current mirror of the low frequency processing means has a further output terminal for supplying a further output current;

the signal processing unit further includes: means for coupling the low frequency processing means to the high frequency processing means; a third input terminal for receiving the further output current; and a third output terminal for supplying to the second input terminal of the high frequency processing means, a current which is related to the further output current;

the coupling means include a third current mirror with a third input branch for transferring an input current;

the third branch having a fifth semiconductor element connecting the third input terminal of the coupling means to a third central terminal via the main current path of the fifth semiconductor element;

the third output branch has a sixth semiconductor element connecting the third central terminal to the third output terminal via its main current path;

the second current mirror of the high frequency processing means include a third semiconductor element and a fourth semiconductor element, each having main electrodes defining a main current path, and a control electrode, the control electrode of the third semiconductor element and the control electrode of the fourth semiconductor element are connected to one another;

the second current mirror includes:

a second input branch for transferring an input current and connecting the second input terminal to a second central terminal via the main current path of the third semiconductor element; and a second output branch for transferring an output current and connecting the second central terminal to the second output terminal via the main current path of the fourth semiconductor element;

and in which:

the third semiconductor element of the second current mirror is connected to the second central terminal via a parallel arrangement of a third resistive element and a second capacitive element; and the fourth semiconductor element is connected to the second central terminal via a parallel arrangement of a fourth resistive element and a third capacitive element.

10. The apparatus of claim 3, in which:

the first current mirror of the low frequency processing means has a further output terminal for supplying a further output current;

the signal processing unit further includes: means for coupling the low frequency processing means to the high frequency processing means; a third input terminal for receiving the further output current; and a third output terminal for supplying to the second input terminal of the high frequency processing means, a current which is related to the further output current;

the coupling means include a third current mirror with a third input branch for transferring an input current;

the third branch having a fifth semiconductor element connecting the third input terminal of the coupling means to a third central terminal via the main current path of the fifth semiconductor element;

the third output branch has a sixth semiconductor element connecting the third central terminal to the third output terminal via its main current path;

the second current mirror of the high frequency processing means include a third semiconductor element and a fourth semiconductor element, each having main electrodes defining a main current path, and a control electrode, the control electrode of the third semiconductor element and the control electrode of the fourth semiconductor element are connected to one another;

the second current mirror includes:

a second input branch for transferring an input current and connecting the second input terminal to a second central terminal via the main current path of the third semiconductor element; and a second output branch for transferring an output current and connecting the second central terminal to the second output terminal via the main current path of the fourth semiconductor element;

and in which:

the third semiconductor element of the second current mirror is connected to the second central terminal via a parallel arrangement of a third resistive element and a second capacitive element; and the fourth semiconductor element is connected to the second central terminal via a parallel arrangement of a fourth resistive element and a third capacitive element.

* * * * *